(12) United States Patent
Weiss

(10) Patent No.: US 9,548,863 B2
(45) Date of Patent: Jan. 17, 2017

(54) METHOD FOR UNAMBIGUOUS MARKING OF AN OBJECT

(71) Applicant: AUTHENTIC VISION GMBH, Salzburg (AT)

(72) Inventor: Thomas Weiss, Salzburg (AT)

(73) Assignee: AUTHENTIC VISION GMBH, Salzburg (AT)

( * ) Notice: Subject to any disclaimer, the term of this patent is extended or adjusted under 35 U.S.C. 154(b) by 14 days.

(21) Appl. No.: 14/409,345

(22) PCT Filed: Jun. 18, 2013

(86) PCT No.: PCT/AT2013/050121
§ 371 (c)(1),
(2) Date: Dec. 18, 2014

(87) PCT Pub. No.: WO2013/188897
PCT Pub. Date: Dec. 27, 2013

(65) Prior Publication Data
US 2015/0188706 A1    Jul. 2, 2015

(30) Foreign Application Priority Data
Jun. 18, 2012 (AT) .............................. A 50237/2012

(51) Int. Cl.
*H04L 9/32* (2006.01)
*H04L 9/14* (2006.01)
(Continued)

(52) U.S. Cl.
CPC .................. *H04L 9/14* (2013.01); *G06K 19/08* (2013.01); *G06K 19/10* (2013.01); *H04L 9/30* (2013.01);
(Continued)

(58) Field of Classification Search
CPC ...................................................... H04L 9/32
See application file for complete search history.

(56) References Cited

U.S. PATENT DOCUMENTS

| 2004/0088231 A1 | 5/2004 | Davis |
| 2006/0091208 A1 | 5/2006 | He et al. |

(Continued)

FOREIGN PATENT DOCUMENTS

| WO | WO97/24699 | 7/1997 |
| WO | WO03/021541 | 3/2003 |

(Continued)

OTHER PUBLICATIONS

International Preliminary Report on Patentability issued in PCT Application No. PCT/AT2013/050121, mailed Jun. 16, 2014.

*Primary Examiner* — Josnel Jeudy
(74) *Attorney, Agent, or Firm* — Norton Rose Fulbright US LLP

(57) ABSTRACT

The invention relates to a method or system for unambiguous marking of an object (1), wherein unique features (3) are digitized and signed with a private key (9) and the unique features (3) themselves, in addition to the signature (8) of the digitized features (6), are arranged on the object (1) or a packaging (2) of the object (1), or are formed by at least a part of the object (1) or the packaging (2) thereof, and the authenticity of the object (1) is determined by comparison of the unique features (3) with the decrypted signature (8) of the digitized features (6), which signature is arranged on the object (1) or the packaging (2) thereof and decrypted with a public key (11). To create a secure method that can be implemented simply and cost-effectively, the unique features (3) are formed by optically detectable three-dimensional structures or materials with optical properties that differ depending on the viewing angle (15), and the digitized features (6) are generated by means of an algorithm (17)

(Continued)

which is applied to at least two digital images (16, 16') of the unique features (3) recorded with at least one digital camera (5).

23 Claims, 3 Drawing Sheets

(51) Int. Cl.
  *G06K 19/08* (2006.01)
  *G06K 19/10* (2006.01)
  *H04L 9/30* (2006.01)
(52) U.S. Cl.
  CPC ......... *H04L 9/3247* (2013.01); *H04L 2209/24* (2013.01)

(56) References Cited

U.S. PATENT DOCUMENTS

| | | | |
|---|---|---|---|
| 2006/0091221 A1 | 5/2006 | He et al. | |
| 2008/0249951 A1* | 10/2008 | Gilder | G06Q 20/04 705/76 |
| 2012/0067960 A1 | 3/2012 | Rowe | |

FOREIGN PATENT DOCUMENTS

| | | |
|---|---|---|
| WO | WO03/087991 | 10/2003 |
| WO | WO2004/013735 | 2/2004 |
| WO | WO2005/024697 | 3/2005 |
| WO | WO2008/128714 | 10/2008 |

\* cited by examiner

METHOD FOR UNAMBIGUOUS MARKING OF AN OBJECT

CROSS-REFERENCE TO RELATED APPLICATIONS

This application is a national phase application under 35 U.S.C. §371 of International Application No. PCT/AT2013/050121 filed 18 Jun. 2103, which claims priority to Austrian Application No. A 50237/2012 filed 18 Jun. 2012. The entire contents of each of the above-referenced disclosures is specifically incorporated by reference herein without disclaimer.

The invention relates to a method or system respectively for unambiguous marking of an object, wherein unique features are digitized and signed with a private key, and the unique features themselves, in addition to the signature of the digitized features, are arranged on the object or a packaging of the object or are formed by at least a part of the object or the packaging thereof, and the object is authenticated by comparing the unique features with the decrypted signature of the digitized features, which signature is arranged on the object or the packaging thereof and decrypted with a public key.

Furthermore, the invention relates to an object or the packaging thereof marked in accordance with the above method or system.

The method of the invention serves to differentiate, in a manner as simple as possible, e.g. by means of a mobile terminal device, an original from a plagiarized version, i.e. a copy not authorized by the author, by means of applying a digital signature. Applications range from drugs, data carriers, luxury products to entrance tickets.

Known methods use different types of security codes which, for the purpose of verification, are detected by means of suitable reading devices and compared to codes stored in databases. A huge disadvantage consists in the need to access the database to verify the authenticity of the object. Thus, only users having the corresponding equipment can verify the authenticity.

Other methods rely solely on the use of security features which are hard to copy. For example, they include holograms which are usually arranged on software packaging of original manufacturers. Although verifying the authenticity does not require any information to be retrieved from an external database, such a security feature may be reproduced with more or less effort.

Other methods digitize two-dimensional visual properties of unique features, sign them with a private key and apply such a signature on the object. Very small structures are used as unique features to prohibit easy copying thereof, whereby verification requires a suitable reading device. Similar methods, which use features that are larger and are recordable with digital cameras, require additional haptic or visual verification by the user, thus reducing the available security and simplicity. In addition, known methods are based on a complete correspondence of the unique features, whereby verification of the unique features is no longer possible even after some minor damage.

WO 2004/013735 A2 describes a method or system for unambiguous marking of objects, wherein a magnetic two-dimensional code is applied and the information contained in the code is read out and verified by a corresponding scanner. As a matter of fact, such magnetic codes have the advantage that they cannot be imitated with conventional copiers, however, the scanners required for verification are complex and expensive and for this reason are not available for all users or owners of the objects to be protected.

WO 2005/024697 A2 describes a method for marking objects, wherein a digital signature, which contains product-specific data of the object to be protected and unique features of the RFID (radio frequency identification) chip, is stored in an RFID chip and is attached on the object to be protected or the packaging thereof. The unique features are provided in the form of a digital code which is built into the RFID chip. This is not a characteristic produced by a random manufacturing process and for this reason can be replicated with the corresponding knowledge or the appropriate hardware. Once the RFID chip is removed from the original and applied on the packaging of a plagiarized product, one can no longer determine that it is not an original.

From WO 1997/24699 A1 a method for the unique marking of an object is known, wherein the microtopography of unique features is digitized and signed with a private key and the signature is arranged on the object. As a matter of fact, the microtopography has the advantage that it cannot be imitated by means of conventional copiers, however, the scanners required for verification are complex and expensive and for this reason are not available for all users or owners of the objects to be protected.

WO 2003/021541 A2 shows a method for unambiguous marking of an object, wherein visual properties of unique features are digitized and signed with a private key and the signature is arranged on the object. The structures used for this purpose are very small, such as for example the impurities of a diamond. For this reason, the scanners required for verification are complex and expensive and therefore are not available for all users or owners of the objects to be protected. Furthermore, said method verifies the unique features only on the basis of their two-dimensional properties, which makes it considerably easier to replicate or forge them. In addition, the method is based on a complete match of the unique features, whereby a minor damage of the unique features caused e.g. during transportation prohibits verification.

US 2006/091208 A1 shows a method for unambiguous marking of an object, wherein visual properties of unique features are digitized and signed with a private key and the signature is arranged on the object. The method checks the unique features only on the basis of their two-dimensional properties. It is true that any counterfeiting by way of a simple, two-dimensional copy using features that reflect only light of a certain wavelength is rendered more difficult, however, the scanners required for checking are complex and expensive and therefore are not available for all users or owners of the objects to be protected.

It is the object of the invention to provide a method or system described above for unambiguous marking of objects for determining their authenticity, which method can be implemented in a simple and cost-effective manner and which enables also the owner of the object to check the authenticity of the object by simple means.

The object is solved in that the unique features are formed by optically detectable three-dimensional structures or materials having optical properties that are different depending on the viewing angle, and the digitized features are generated by means of an algorithm which is applied to at least two digital images of the unique features recorded with at least one digital camera. The present method is characterized in that certain unique features are used for object marking, which features are as difficult as possible to reproduce or copy. For example, such unique features having different optical properties may be contained in a film, which depending on the viewing angle has different random patterns, or in a transparent film with built-in particles showing random three-dimensional properties, or in a serialized or random hologram difficult to copy. The unique features are arranged on the object or packaging thereof or are formed by at least part of the object or the packaging thereof. In addition, visual properties of these unique features are digitized and signed with a private key and the resulting signature of these digitized features is arranged on the object or the packaging thereof, in addition to the unique features themselves. The object can now be authenticated by comparing the features themselves and the decoded signature of the digitized features decoded with a public key, without retrieving information from an external database. In the simplest case, a camera is used for this purpose, which nowadays is included in almost any mobile phone, tablet PC or the like. The manufacture of the features and their digitization and signing may be achieved with simple methods in a relatively simple and cost-efficient manner, thus making it possible to have a wide range of applications of the object even for protecting mass products. Due to the use of optically detectable three-dimensional structures or materials, which have a three-dimensional effect as holograms do, for instance, i.e. have optical properties that depend on the angle of view, it is the task of the used algorithm to determine the quality difference caused by a copy, which e.g. shows in the lack of three-dimensional structures or of optical properties depending on the angle of view.

The unique features are advantageously formed by random, optically detectable, three-dimensional structures or randomly arranged materials having different optical properties depending on the viewing angle.

The unique features are advantageously formed by at least one part of a film containing the three-dimensional structures or materials. Depending on the angle of view or the type of illumination, the three-dimensional structures or materials contained in the film have different random patterns. Producing at least one part or portion of the film will add to security. For example, the film may be formed by a hologram.

The degree of security is further increased in that the at least one part of the film is selected at random. The parts or portions may be created by cutting or punching them out of the film.

The at least two digital images are advantageously established from at least two images of the unique features made using the at least one digital camera from different viewing angles in each case.

Likewise or additionally, the at least two digital images may also be established from at least two images of the unique features made with at least one digital camera and using an illumination from different directions in each case. The position of the at least one camera may also remain unchanged when the images are recorded.

The unique features are advantageously derived from the object itself or from the packaging thereof. For example, the structure of the surface of the object itself or the packaging may be used as a unique feature. It is important that the unique features allow for a clear distinction from other objects. In addition, the unique features must be difficult or impossible to copy, thus making it more difficult to mark plagiarized products. Different methods help to clearly distinguish a copy of the unique features from the original.

The object is preferably authenticated by means of the optical detection of the unique features or at least a part of the object or the packaging thereof with at least one digital camera from at least two different viewing angles and/or with at least one digital camera from one viewing angle with an illumination from different directions respectively and optical detection of the signature of the digitized features and processing of the optical images. Thus, it is possible for the buyer of the object to authenticate the object without having to purchase certain devices or access specific databases. For example, the buyer can record the feature and its signature applied on the object or the packaging thereof by means of his mobile phone, tablet PC or notebook, which are usually equipped with a camera, and immediately find out if it is an original or plagiarism. All that is required for decrypting the signature is a public key. If the properties of the feature and/or the signature are human-readable, they may also be read out by the user and entered into the device, for instance, a mobile phone suitable for processing.

The unique features and/or the signature of the digitized features can be applied directly onto the surface of the object or the packaging thereof, e.g. printed thereon. If the unique features are formed by the object itself or the packaging thereof, only the signature of the digitized features must be applied onto the surface of the object or the packaging thereof. For the purpose of marking from which areas of the surface of the object or the packaging the unique features are derived, a corresponding marking, e.g. in the form of a frame, may be provided on the object or the packaging. Said marking shows the user the area to be scanned for authenticating, e.g. with his mobile phone.

To prevent any abuse, by detaching the unique features and the signature of the digitized features from an original packaging and applying them onto the packaging of a plagiarized product, it is provided that the unique features and/or the signature of the digitized features applied directly onto the surface of the object or the packaging thereof are visually and/or functionally damaged on manipulation by a predetermined breaking point or the like. Trying to detach the feature or the signature from the object or the packaging will destroy the feature or the signature due to included predetermined breaking points and thus authenticating the object will be rendered impossible. If the signature is stored in an RFID chip, for example, trying to detach the RFID chip from the object or the packaging thereof will destroy the antenna of the transponder and thus make it impossible to read out the content.

As an alternative to applying the unique features and/or the signature of the digitized features directly onto the surface of the object or the packaging thereof, these features may also be applied onto at least one carrier, in particular printed thereon, and the at least one carrier may be applied onto the surface of the object or the packaging thereof, in particular adhered or glued thereon. This facilitates the manufacture of the unique features and the signature of the digitized features, which may be subsequently applied, e.g. glued, onto the respective object or the packaging thereof. The unique features and the signature can be arranged on one carrier or on separate carriers. If the unique features are formed by the object itself or the packaging thereof, only one carrier is required for the signature of the digitized features.

In this case, too, for enhancing the security it is advantageous if at least one carrier is damaged visually and/or functionally by the use of a predetermined breaking point on manipulation, in particular during detachment. This makes it impossible to transfer the unique marking of an original product onto a plagiarized product or the packaging thereof.

According to another feature of the invention, the unique features have different light reflecting properties depending on the viewing angle as optical properties. Said different light reflecting properties which depend on the angle of view can be generated e.g. by reflecting particles in a film.

According to another feature of the invention it is provided that the unique features applied onto the object or the packaging thereof and the signature of the digitized features comprise at least one additional security feature. Such an additional security feature may be formed e.g. by raised or lowered surfaces, watermarks, holograms, reflecting surfaces etc., as is the case with bank notes. This measure helps to achieve an even improved counterfeit protection.

In addition, digitized information of the object can be added to the digitized features before signing. For example, the information may include the name of the object or the product, details concerning the manufacturer, the date of manufacture etc. Thus, the digitized features contain information on the object to be marked, which helps to establish an even closer relationship between the signature and the object.

In addition or as an alternative, digitized information of the object and/or the digitized features may be added to the signature of the digitized features.

The signature of the digitized features is preferably displayed in the form of a one- or two-dimensional bar code. It is easy to scan such a code, in particular with common devices such as the camera of a mobile phone and therefore it is easy to authenticate the object.

In addition or as an alternative, the unique features and/or the signature may be human-readable and may be read out by the user and entered in a device suitable for processing, preferably a mobile terminal, e.g. a mobile phone.

In addition or as an alternative, the signature of the digitized features can also be stored in an RFID element. Of course, the effort and time required for digitization and signing of the features also depend on the object to be marked and its value.

If the signature of the digitized features and/or the digitized information of the object are stored in a central database, important information may be obtained for subsequent retrieval. In addition, the signature can be replaced by an unambiguous number, which refers to the signature of the digitized features and/or the digitized information of the object which are stored in the central database.

When authenticating the object, data for the unambiguous identification of the object and data for its localization (e.g. coordinates of the global positioning system GPS) can be detected and stored in a central database.

The present invention will be explained in more detail on the basis of the attached drawings. These show embodiments of the method or system for unambiguous marking of an object.

Figure 1:
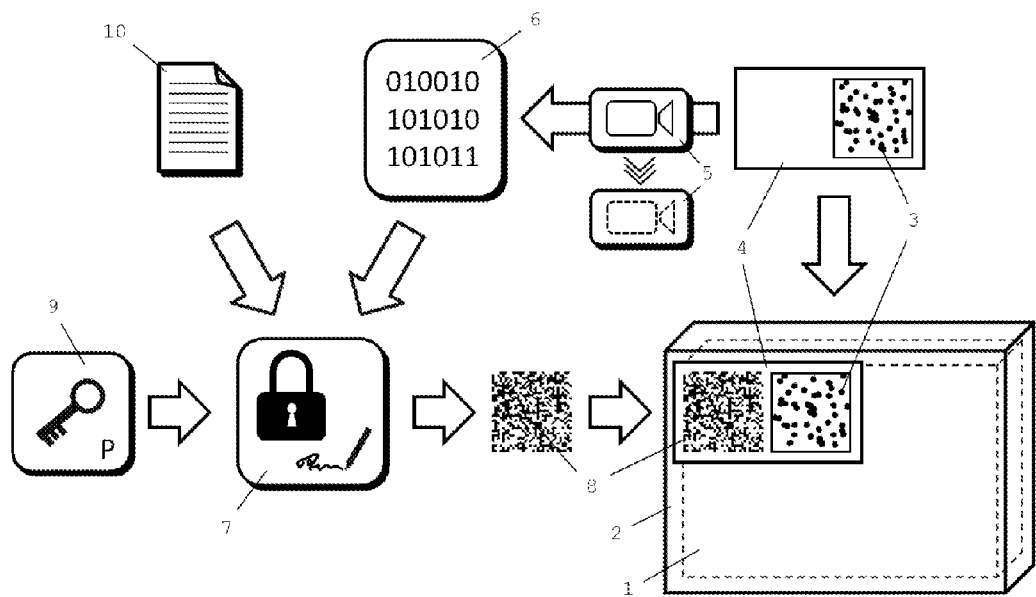
FIG. 1 is a block diagram of a use case for marking an object.

FIG. 1 shows a block diagram of a use case for marking an object 1 arranged in a packaging 2. In accordance with the invention, unique features 3 are arranged on the packaging 2 of the object 1. As shown in FIG. 1, these unique features 3 can be manufactured e.g. from randomly arranged particles, which are pressed onto a carrier 4 and, depending on the angle of view, have different optical properties, e.g. light reflecting properties. The unique features 3 arranged on the carrier are additionally digitized, which may be done with at least one digital camera 5, e.g. a mobile telephone. For this purpose, at least two images from different viewing angles or at least two images with illumination from different directions in each case are acquired and, with the aid of an algorithm, reduced to their unique three-dimensional features or optical features depending on the angle of view. These digitized features 6 are now signed by a signing method 7 and the signature 8 is applied e.g. in the form of a two-dimensional code directly onto the packaging 2 or onto a carrier 4, which in turn is applied, in particular glued onto the packaging 2. The signing 8 is effected by applying a private key 9. Prior to the signing method 7 digitized information 10 converning the object 1 to be marked can be added to the digitized features 6, e.g. product names, manufacturing data, production data etc. The embodiment shown in FIG. 1 shows a method for unambiguous marking of an object 1, which does not have any unique features 3 itself, i.e. which therefore have to be generated and added to the object 1 or the packaging 2 thereof. If the object 1 or the packaging 2 thereof comprises unique features 3 already, no unique features 3 need to be added, but a part of the object 1 itself or the packaging 2 thereof can be used. For example, the surface quality of a part of the object 1 or the packaging 2 thereof can be used for this purpose. All that has to be defined is an area of the object 1 or the packaging 2 thereof, which area contains the unique features 3 having the different optical properties depending on the angle of view and from which the signature 8 is generated.

In any case, it is important that the unique features as well as the signature 8 of the digitized unique features 3 are arranged on the object 1 or the packaging 2 thereof for its unambiguous marking or are formed by at least a part of the object 1 or the packaging 2 thereof. For preventing the features 3 as well as the signature 8 from being transferred from an original to a plagiarized product, it is advantageous if these unique features 3 or the signature 8 of the digitized features 6 are visually and/or functionally damaged by a predetermined breaking point or the like in the event of manipulation. Trying to detach the features 3 or the signature 8 or its carrier 4 will result in destroying them and the authentication of the object 1 is rendered impossible.

The unique features 3 can be manufactured in manifold ways. For example, floating particles may be added to a transparent film during its manufacture, which particles exhibit different random patterns depending on the angle of view. The random application of snippets of a film, which have different light reflecting properties depending on the angle of view, can also serve the manufacture of such unique features 3. For example, a film can be made up of a diversely coloured granulate, due to which the former has a random structure and a portion of said film can be used as carrier of these unique features 3. The application of a liquid dye on an absorbent substrate may also serve the manufacture of such unique features 3.

Randomly selected parts or portions of a hologram can also serve the manufacture of the unique features 3. Such random holograms can be produced by e.g. a random, i.e. not registered punching or stamping of a hologram film.

A wide range of known methods can be applied as methods for digitization and signing. In particular asymmetric cryptosystems or encryptions are to be applied for signing.

Figure 2:
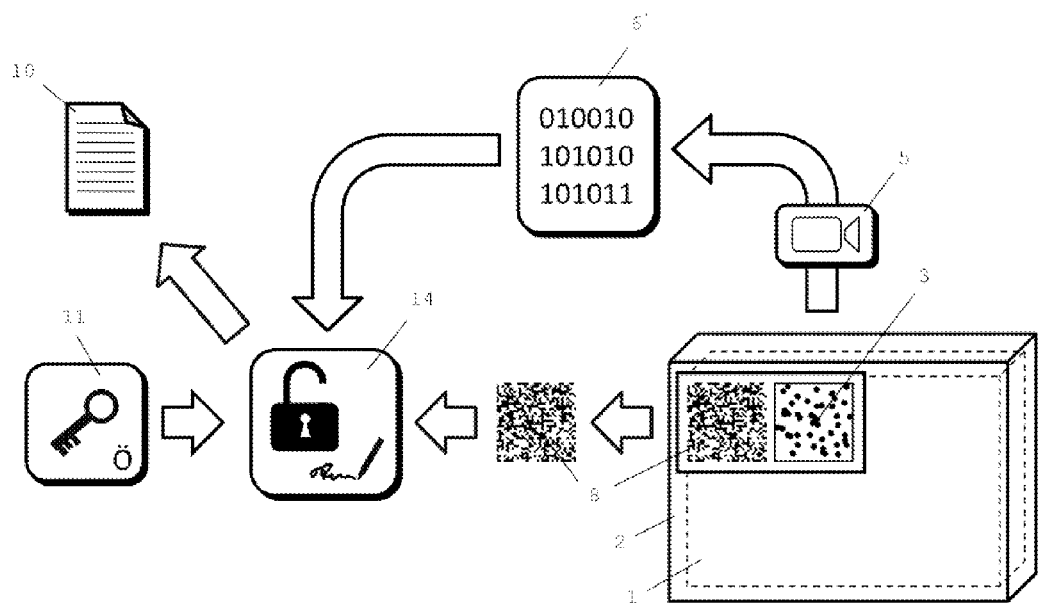
FIG. 2 is a block diagram of a use case for authenticating the object marked according to FIG. 1.

In FIG. 2 a block diagram shows how the authenticity of the object 1 can be examined on the basis of the marking according to FIG. 1. For this purpose, the unique features 3 are recorded e.g. by means of a camera 5 from at least two perspectives and are digitized, thus obtaining the digitized features 6'. In addition, the signature 8 arranged on the object 1 or the packaging 2 thereof is read out, decrypted with a public key 11 in block 14 for decryption and comparing operations and the digitized features 6 are generated therefrom. These digitized features 6 are compared with the digitized features 6' and, in the case of sufficient correspondence, the authenticity of the object 1 is determined. Therefore checking the authenticity of the object 1 does not require a central database and all that is required is to let the user know the public key 11, with which he can effect decryption of the signature 8. In addition, security may be increased in that the unique features 3 have further properties, allowing verification of the authenticity. In particular, a perceptual examination 12 of the features 3 can be effected, which allows to determine that it does not pertain to a copy of features 3. Examples of this are certain raised or lowered surfaces, watermarks, holograms, reflecting surfaces etc.

Figure 3:
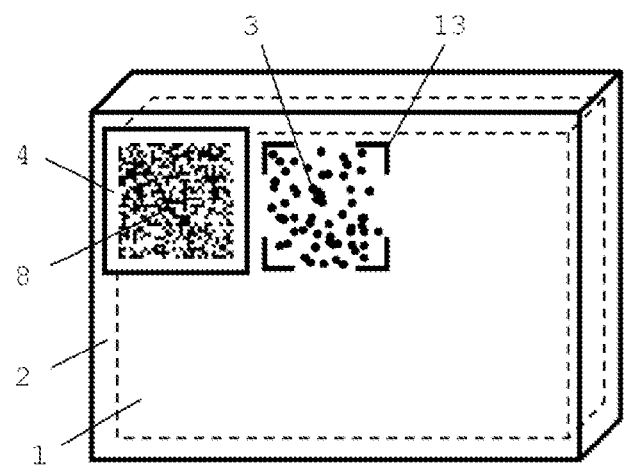
FIG. 3 is another embodiment in which the unique features are formed by the packaging of the object itself which is to be marked.

FIG. 3 shows another embodiment in which the unique features 3 are formed by the object 1 itself or the packaging 2 thereof. In this case, an area 13 is defined in which the unique features 3 are contained and which is used for digitization and signing of the features 3. The resulting signature 8 is arranged e.g. next to this area 13 directly on the surface of the packaging 2 or a carrier 4 containing the signature 8 is applied onto the packaging 2 of the object 1.

Figure 4:
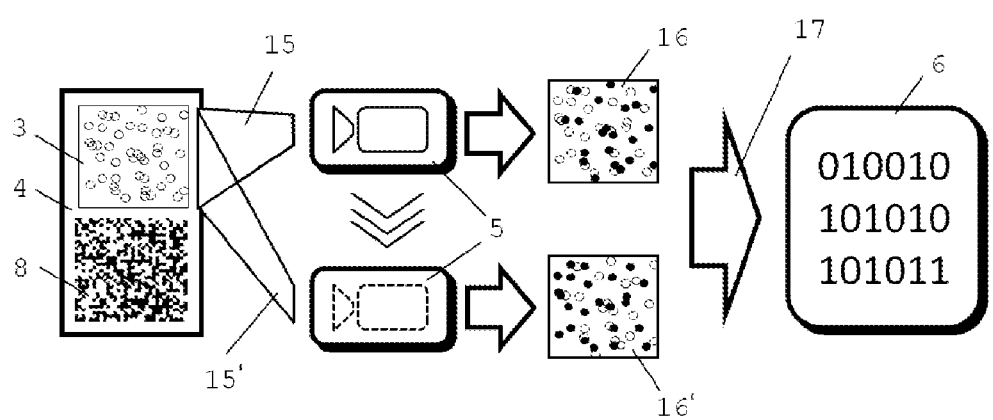
FIG. 4 is a detailed view of the digitization of the unique features with the help of two acquisitions from different viewing angles.

FIG. 4 shows the detailed block diagram of the digitization of the unique features 3 shown in FIGS. 1 and 2. Here, for example, a digital image 16 of the unique features 3 is obtained, e.g. with the help of a digital camera 5. Subsequently, the position of the camera 5 is changed and another acquisition is effected from the angle of view 15', thus generating the digital image 16'. From these two digital images 16, 16', which differ from each other due to the three-dimensional structure or e.g. the light reflecting properties of the features 3 depending on the viewing angle 15, the algorithm 17 calculates the digitized three-dimensional features 6 or 6' or the features 6 or 6' depending on the angle of view 15 respectively from the specific two-dimensional information.

Figure 5:
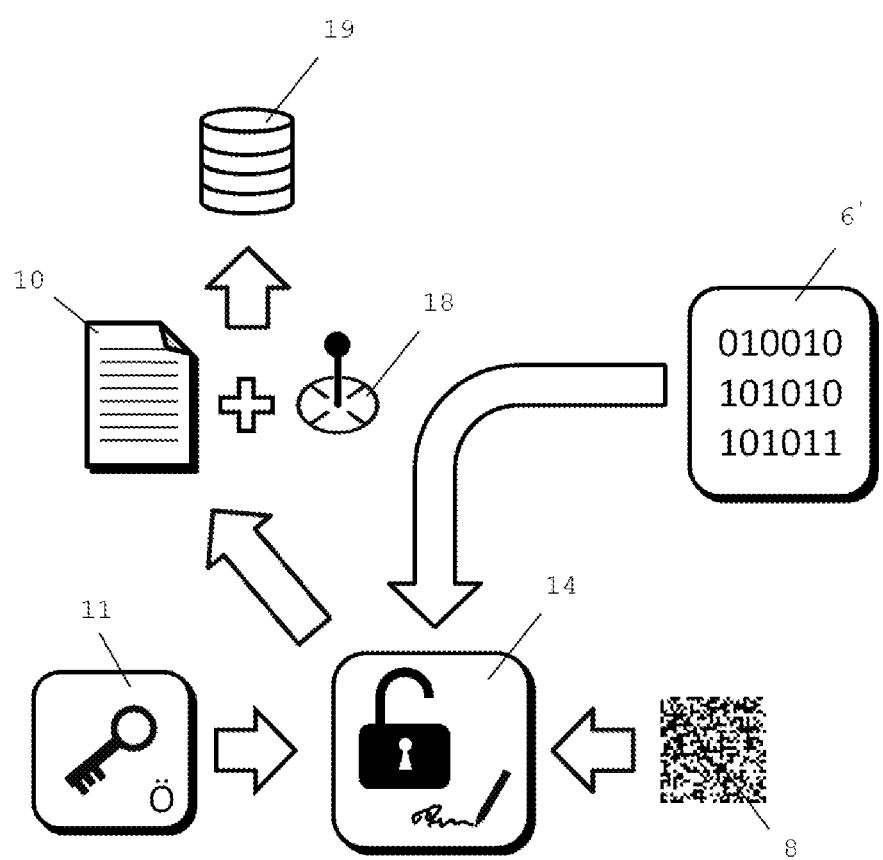
FIG. 5 is a block diagram of a use case for authenticating the object, in which data for the unambiguous identification of the object and the localization thereof are additionally stored in a central database.

FIG. 5 shows a block diagram of an extension of the use case shown in FIG. 2 of checking the authenticity of the object 1. After checking the authenticity, digitized information 10 on the object 1 to be marked is stored in a central database 19, together with data 18 for its localization, such as coordination of the global positioning system (GPS). These data can provide interesting information in connection with the object 1.

The method according to the invention can be used e.g. to differentiate drugs of original manufacturers from plagiarized products and enable the end user or even the distributor to easily check the authenticity. No special reading devices or access to databases are necessary. Since the method takes into consideration the optical three-dimensional properties of the unique features 3, no additional processes such as a perceptual examination by the user are required to prevent copies. The method can be implemented in a simple and cost-efficient manner.

The invention claimed is:

1. A method for unambiguous marking of a product comprising:
   arranging unique features on the product or a packaging of the product or establishing unique features from at least a part of the product or the packaging thereof;
   digitizing the unique features and signing the digitized features with a private key; and
   arranging the signature of the digitized features on the product or a packaging of the product;
   wherein authenticity of the product can be determined by comparing the unique features with a decrypted signature of the digitized features, which signature is arranged on the product or the packaging thereof and decrypted with a public key;
   wherein the unique features are formed by means of three-dimensional structures or materials with optical properties that differ depending on a viewing angle, which structures or materials are optically detectable by a mobile phone, tablet PC or notebook, equipped with a camera; and
   wherein the digitized features are generated by an algorithm which is applied to at least two digital images of the unique features recorded with at least one digital camera from different viewing angles and/or with an illumination from different directions respectively.

2. The method of claim 1, wherein the unique features are formed by random, optically detectable three-dimensional structures or randomly arranged materials with optical properties that differ depending on the angle of view.

3. The method of claim 1, wherein the unique features are formed by at least one part of a film containing the three-dimensional structures or materials.

4. The method of claim 3, wherein the at least one part of the film is chosen at random.

5. The method of claim 1, wherein the unique features are derived from the product or the packaging thereof.

6. The method of claim 1, wherein the authenticity of the product is detected by:
   optical detection of the unique features or at least a part of the product or the packaging thereof captured in optical images by at least one digital camera always from at least two different angles of view and/or with at least one digital camera from an angle of view with an illumination from different directions;
   optical detection of the signature of the digitized features; and
   processing of the optical images.

7. The method of claim 1, wherein the unique features and/or the signature of the digitized features are applied directly on a surface of the product or a packaging thereof.

8. The method of claim 7, wherein the unique features applied directly on the surface of the product or the packaging thereof and/or the signature of the digitized features are damaged visually and/or functionally on manipulation by a predetermined breaking point.

9. The method of claim 1, wherein the unique features and/or the signature of the digitized features are applied directly on at least one carrier and the at least one carrier is applied on a surface of the product or the packaging thereof.

10. The method of claim 9, wherein the at least one carrier is visually and/or functionally damaged upon manipulation.

11. The method of claim 10, wherein the at least one carrier is visually and/or functionally damaged upon detachment or by a predetermined breaking point.

12. The method of claim 1, wherein the unique features have an at least partially random surface geometry, coloration, or a combination thereof.

13. The method of claim 1, wherein the unique features have different light reflecting properties depending on an angle of view.

14. The method of claim 1, wherein the unique features applied on the product or the packaging thereof and the signature of the digitized features comprise at least one additional security feature.

15. The method of claim 14, wherein the at least one additional security feature comprises a raised or deepened surface, watermark, hologram or reflecting surface.

16. The method of claim 1, wherein digitized information of the product is entered and added to the digitized features prior to signing.

17. The method of claim 1, wherein digitized information of the product is entered and added to the signature of the digitized features and/or the digitized features are added to the signature of the digitized features.

18. The method of claim 1, wherein the signature of the digitized features is arranged on the product or the packaging thereof as a one-dimensional or two-dimensional barcode.

19. The method of claim 1, wherein the unique features and/or the signature are human-readable and are read out by a user and entered into a device that is suitable for processing.

20. The method of claim 1, wherein the signature of the digitized features is stored in a radio frequency identification (RFID) element.

21. The method of claim 1, wherein the signature of the digitized features is stored in a central database and/or digitized information of the product is entered and stored in the central database.

22. The method of claim 1, further comprising checking the authenticity of the product, wherein data for unambiguous identification of the product and data for a localization thereof are detected and stored in a central database.

23. A method for unambiguous marking of an object comprising:
    arranging unique features on the object or a packaging of the object or establishing unique features from at least a part of the object or the packaging thereof, wherein the unique features are formed by three-dimensional structures or materials with optical properties that differ depending on a viewing angle, which structures or materials are optically detectable by a mobile phone, tablet PC or notebook, equipped with a camera;
    recording at least two digital images of the unique features with at least one digital camera from different viewing angles and/or with an illumination from different directions respectively;
    digitizing the at least two digital images to form digitized unique features, wherein the digitized unique features are generated by an algorithm;
    signing the digitized unique features with a private key; and
    arranging the signature of the digitized features on the object or a packaging of the object,
    wherein authenticity of the object can be determined by comparing the unique features with a decrypted signature of the digitized features, which signature is arranged on the object or the packaging thereof and decrypted with a public key.

* * * * *